March 4, 1930.  C. D. BURNEY  1,749,065
MEANS FOR BERTHING AIRSHIPS
Filed Dec. 20, 1928   2 Sheets-Sheet 1
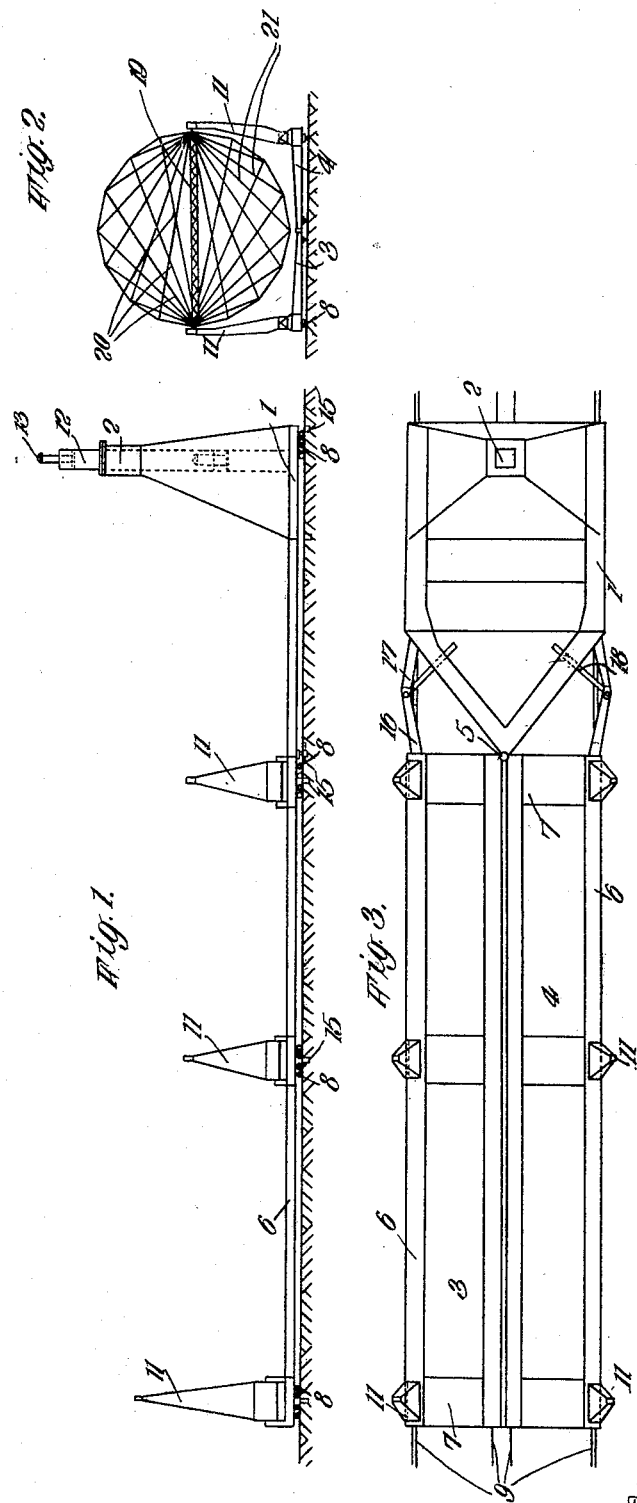

March 4, 1930.  C. D. BURNEY  1,749,065
MEANS FOR BERTHING AIRSHIPS
Filed Dec. 20, 1928  2 Sheets-Sheet 2
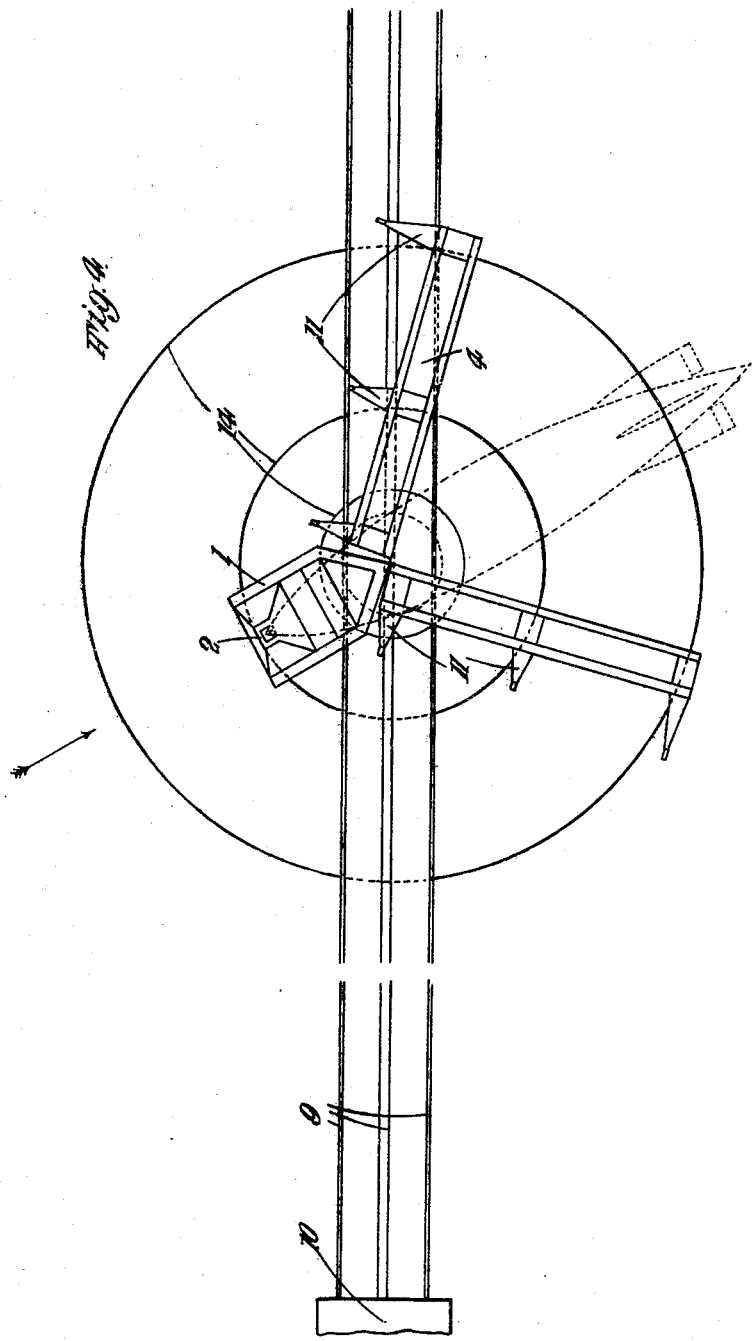

Patented Mar. 4, 1930

1,749,065

UNITED STATES PATENT OFFICE

CHARLES DENNISTON BURNEY, OF WESTMINSTER, LONDON, ENGLAND, ASSIGNOR TO AIRSHIP GUARANTEE COMPANY LIMITED, OF LONDON, ENGLAND, A BRITISH COMPANY

MEANS FOR BERTHING AIRSHIPS

Application filed December 20, 1928, Serial No. 327,239, and in Great Britain January 30, 1928.

The present invention relates to the berthing of airships for the purpose of the transfer to or from the airship or passengers or goods, for repairs or for other reasons.

It has already been proposed to berth an airship in a shed or alongside an appropriate landing stage by lowering it on to a carriage or the like which may then be brought into the shed or into proximity to the landing stage. In employing such a carriage it may be brought into a position in which the airship may be hauled down on to it while head to wind, but almost invariably when the carriage with the airship on it is being moved into its berthing position it is necessary that the airship should be exposed more or less directly to a side wind, and hitherto it has not been found possible to secure the airship to the carriage in such a manner as satisfactorily to withstand the stresses induced by such a side wind. It is the object of the present invention to overcome this drawback and generally to facilitate the berthing of an airship or its speedy release into the air.

According to this invention, for the purpose of securing an airship on a carriage or raft, the latter is provided with one or more pairs of arms fitted to the sides of the carriage and provided with attachment means for ropes connecting them with the airship. The arms may be hinged to the carriage so that when it is desired to secure an airship, they may be extended in a substantially horizontal direction and then connected with the airship by ropes, which are gradually hauled in by manual or mechanical means to bring the airship down on to the carriage, the arms being simultaneously raised and finally assuming a substantially vertical position to constitute a cradle embracing the airship. Each arm may also be fitted with a suitable form of positive mechanical engagement the counterpart of which is fixed on the airship so that the latter is held firmly in the cradle. For this purpose one or more substantially horizontal transverse beams or equivalent members, with or without auxiliary transverse wiring system, may be provided in the airship itself to co-operate with the arms in transmitting stresses to the cradle and in firmly securing the airship in position. In order to obviate turning moment due to a side wind, the points of engagement between the arms and the airship are preferably arranged to be at opposite ends of a horizontal diameter of the latter.

In using the above described carriage or raft for berthing an airship, the latter is very generally hauled down on to the carriage by the following series of operations. The airship is first moored, in any suitable known or novel manner, to a mast provided for the purpose, the attachment for this purpose, as is usual in such a case, being made only at one point, generally, in proximity to the nose of the airship so that it is free to swing to the wind, the means of attachment on the mast being such as to allow of the necessary movement. The construction of the mast and its attaching means are such that when the airship has been moored its point of attachment may be drawn down substantially vertically so as to bring the airship in proximity to the carriage which is located on the ground underneath it. The airship having been secured to the carriage, which holds it as in a dock, the carriage is moved bodily into the airship shed or alongside a berthing stage or the like.

For the purpose of readily moving the carriage so that it may be directly underneath the airship in the position which the latter takes up in accordance with the direction of the wind, the carriage may be mounted on a pair of rails each constituted as a circle around the mast. Leading off from this pair of circular rails, by such means as turntables or suitably placed points, is a pair of rails running into the shed in which the airship is to be berthed. If turntables be employed it will be evident that the wheels of the carriage must be so constructed as to permit of their swivelling about a vertical axis. When the airship has been moored to the top of the mast by an attachment at the nose so that it may freely swing to the wind, the carriage is run around the circular pair of rails until it is immediately beneath the airship, the arms of the cradle, if hinged, being in their outwardly extended position. By telescoping the mast or lowering the attachment means along vertical guides, according to the construction adopted, the nose of the airship is then drawn downwards and when the airship has been brought to an appropriate distance above the carriage, ropes are carried from the sides of the airship to the extremities of the cradle arms; these ropes being then hauled in, either by manual or mechanical means located either on the carriage or on the airship, the arms, if extended, are raised to embrace the latter and the permanent means of attachment on their ends are finally connected with their counterparts on the airship, which is thus firmly attached to the carriage. Its connection with the mast may then be cast off, and, if the carriage be not already in line with the pair of rails leading to the shed, it is hauled or otherwise moved around the circular pair of rails until, by means of the turntables or points provided for the purpose, it may be run on the rails leading to the shed, and the airship thus berthed in the shed. Although this may involve exposure of the airship to a side wind, the arms and their attachments are sufficient to ensure that it shall be firmly retained on the carriage or raft.

By this means passengers and freight may be conveniently discharged or embarked while the airship is firmly held in the shelter of the shed, being susceptible neither to variations of wind nor to alterations in buoyancy or trim. It is thus possible to provide suitable permanent landing stages either in the shed or on the moving carriage, correctly positioned so as to coincide with the access hatches in the airship. On leaving the shed a reversal of the above described processes may be followed.

It is clear that one mooring mast may be made to serve a number of sheds and moving carriages, each shed being suitably placed relatively to the mast and provided with rails communicating by turntables or other means with the circular rails surrounding the mast.

In order that the invention may be clearly understood and readily carried into effect it will now be described more fully with reference to the accompanying drawing, which illustrates one form of carriage or raft in accordance with the invention and wherein:—

Figures 1, 2 and 3 are respectively a side elevation, a cross-section and a plan view of the carriage or raft, and Figure 4 shows a method of employing such carriage or raft in berthing an airship.

The particular type of carriage or raft illustrated is constituted by a portion 1, on which there is erected a mooring mast 2, and two portions 3 and 4 longitudinally divided but hinged together and to the portion 1 at the point 5. Each portion 3 or 4 of the raft is constituted by longitudinal members 6 connected together by transverse members 7, the whole raft being mounted on a series of bogies 8 resting on a rail track 9 which leads into the airship shed or berthing stage 10.

Each portion 3 and 4 of the raft is provided with one or more pairs of derrick arms 11 which are hinged so that they can be turned into the horizontal position shown in Figure 4 or raised to the substantially vertical position indicated in the remaining figures. These arms, which may be counterbalanced and power-operated, may be so mounted as to be movable longitudinally along the raft in order to accommodate airships of different designs. Each arm is provided with an attachment for a rope or the like by which it may be connected to an airship to be berthed and it may also have suitable means for mechanically engaging with the airship when the arms have been raised to the position relatively to the latter indicated in Figure 2, wherein the airship is shown in section as finally secured. Such mechanical engagement on the arms, as well as the means of attachment for a rope or the like, may be movable longitudinally along the arms in order to facilitate handling the airship and for dealing with airships of various diameters or designs. As indicated, the arms remote from the mast 2 are preferably longer than those arranged intermediately, this design being adopted to facilitate the handling of the airship when it is being hauled down on to the raft.

It will be understood that the airship is fitted with the counterparts of the means on the arms for mechanically engaging the airship; in connection therewith one or more substantially horizontal beams 19 may be fitted across the airship, preferably in proximity to certain of its transverse frames. These beams may be respectively attached to or form part of such frames, so that stresses induced by a side wind on the airship are transmitted directly from the transverse frames in question to the corresponding derrick arms and thence to the carriage or raft. Instead of or in addition to the above mentioned horizontal beams, the means whereby the airship mechanically engages the derrick arms may be respectively connected by suitable tie-wires with either the transverse or longitudinal frames of the airship or with both. Such a series of tie wires is indicated in Figure 2 being constituted by two sets of wires 20 and 21 radiating respectively from the engagement means on each side of the airship; thus, according to the direction of side wind, one set or the other is thrown into tension, the transverse beam 19, where provided, being, however, in compression in either case. In order to ensure against the possibility of its overturning due to the action of the strongest side wind likely to be encountered, the carriage is made of sufficient weight or is ballasted or any suitable anchoring means may be employed for the attainment of this end.

To enable an airship to be secured on the raft while it is still moored by the nose to the mast 2, the latter is provided with a lift 12 adapted to travel up and down the mast in a substantially vertical direction and provided with any suitable mooring device 13. Thus the airship may be initially moored when the lift 12 is in the elevated position shown in Figure 1 and may then be lowered toward the raft by depressing the lift to the position shown in dotted lines in Figure 1, the airship being at the same time suitably handled as above indicated by ropes attached to the arms 11.

When it is desired to berth an airship it is essential that the carriage or raft shall be brought head to wind; for this purpose the rail track 9 crosses diametrically a circular series of rails 14, Figure 4, the bogies 8 being attached to the raft by vertical pivots so as to be capable of being swung in a horizontal plane to rest either on the straight rail track 9 or on the circular series of rails 14 which are suitably spaced for this purpose.

For the purpose of transferring the carriage or raft from the straight rail track 9 to the circular series of rails 14, hydraulic jacks or like means are provided on the various portions of the raft and adapted to bear on suitably spaced concrete or like blocks 15 located in the ground. The raft having been brought into such a position that its supporting bogies 8 are located at the intersection of the straight track 9 with the circular rails 14, the hydraulic jacks are simultaneously operated and the raft as a whole raised to a sufficient extent to allow the bogies 8 to be turned about their vertical pivots, whereby, on the raft being again lowered, they rest on the circular rails 14. When the raft is in this position a hydraulically operated vertical pin mounted thereon, preferably in proximity to the hinge 5, is located vertically above a corresponding socket in the ground at the center of the circular series of rails 14, and, the pin having been thrust into its socket, the raft as a whole is anchored and can then only be moved around the circular rails 14. Thus, when the bogies 8 have been transferred to the circular rails 14, the raft is moved around the latter so that the portion 1 carrying the mast 2 is directed toward the wind, the direction of which is indicated in Figure 4 by an arrow. In calm weather it may then be possible, by lowering the lift 12 and hauling in the ropes connecting the arms 11 with the airship, to lower the latter on to the carriage or raft. If, however, windy weather prevail, it will be found desirable to separate the portions 3 and 4 of the raft to the positions indicated in Figure 4, this being done by traversing the bogies on which these portions rest in opposite directions around the circular rails 14 through an equal angle on either side of the centre line of the air ship, which is indicated by dotted lines in Figure 4. The portions may then be locked in this position relatively to the portion 1 due to the fact that each is connected with that portion by links 16 and 17, Figure 3, to the hinge between which is jointed a link 18 adapted to co-operate with a clamp on the portion 1 whereby it may be gripped in any position. As the airship is hauled down in the manner above indicated, the arms 11, if hinged and extended, being gradually raised to their vertical position, the portions 3 and 4 may be simultaneously gradually closed together so that when the airship has been completely hauled down and secured to the raft these portions are in the closed position indicated in Figure 3, when positive engagement between the arms 11 and the airship by the means fitted on each may be effected. The raft as a whole may then be traversed around the circular rails 14 to the point of their intersection with the straight track 9, whereupon it is again raised by operation of the hydraulic jacks and the bogies swung back to the position in which they may engage the straight track 9, on to which the raft is then lowered and conveyed, with the airship resting upon it, into the airship shed 10. Obviously the division of the carriage or raft as above described is not confined to the construction in which the mast is erected on the carriage, but may be applied in the case in which they are separate.

For the purpose of carrying out all the operations demanding the use of power, that is to say, driving any or all of the bogies 8, raising and lowering the arms 11 and the lift 12, operating the hydraulic jacks and pivot pin or hauling in the ropes, one or more power units may be installed on the raft itself, preferably on the portion 1. Such a unit is conveniently constituted by an oil engine or other form of prime mover arranged to drive a hydraulic pressure generator, the power thus produced being transmitted by suitable pipe line connections, through one or more control stations, to hydraulic motors, rams or the like.

Means may be provided on the carriage, the moving arms or in the structure of the airship itself for ascertaining the condition of buoyancy or loading and the state of trim of the airship, such means consisting of suitable weighing devices designed to indicate the magnitude of the applied forces at each point of attachment.

What I claim and desire to secure by Letters Patent of the United States is:—

1. Means for berthing an airship comprising a carriage consisting of an undivided section and a section divided longitudinally into two portions hinged together and to said undivided section.

2. Means for berthing an airship comprising circular rails, a carriage consisting of an undivided section and a section divided longitudinally into two portions hinged together and to said undivided section and bogies resting on said rails and separately supporting each of said portions.

3. Means for berthing an airship comprising a carriage consisting of an undivided section and a section divided longitudinally into two portions hinged together and to said undivided section, jointed links connecting each of said portions with said undivided section, a clamp on said undivided section and a bar hinged to said jointed links and adapted to be gripped by said clamp.

4. Means for berthing an airship comprising circular rails, a berthing stage, rails intersecting said circular rails and leading to said berthing stage, a carriage adapted to run on either of said sets of rails and to be transferred from one to the other, said carriage consisting of an undivided section and a section divided longitudinally into two portions hinged together and to said undivided section, a mast on said undivided section, means for mooring said airship to said mast and for lowering it on to said carriage while still attached to said mast, arms fitted to the sides of said carriage and adapted to embrace said airship when finally lowered on to said carriage, means whereby ropes from said airship may be attached to said arms, complementary engagement means respectively on each of said arms and on said airship and means whereby said portions of said carriage may be separately traversed around said circular rails.

5. Means for berthing an airship comprising a carriage consisting of an undivided section, a mast on said section, and a section divided longitudinally into two portions hinged together and to said undivided section.

6. Means for berthing an airship comprising a carriage consisting of an undivided section and a section divided longitudinally into two portions hinged together and to said undivided section, arms fitted to the sides of said carriage and adapted to embrace said airship when finally lowered on to said carriage, and at least one substantially horizontal diametral transverse beam in said airship co-operating with said arms, whereby stresses due to a side wind are transferred from said arms at one side to said arms at the other side of said carriage.

7. Means for berthing an airship comprising a carriage consisting of an undivided section and a section divided longitudinally into two portions hinged together and to said undivided section, arms fitted to the sides of said carriage and adapted to embrace said airship when finally lowered on to said carriage, and tie wires within said airship co-operating with said arms whereby stresses due to a side wind are transferred from said arms at one side to said arms at the other side of said carriage.

CHARLES DENNISTON BURNEY.